US010303146B2

(12) United States Patent
West et al.

(10) Patent No.: US 10,303,146 B2
(45) Date of Patent: May 28, 2019

(54) SERVOMECHANISM ERROR HANDLING

(71) Applicant: Oracle International Corporation, Redwood Shores, CA (US)

(72) Inventors: Christopher West, Longmont, CO (US); James Baer, Arvada, CO (US); Terry Lane, Westminster, CO (US)

(73) Assignee: Oracle International Corporation, Redwood Shores, CA (US)

(*) Notice: Subject to any disclaimer, the term of this patent is extended or adjusted under 35 U.S.C. 154(b) by 36 days.

(21) Appl. No.: 15/610,086

(22) Filed: May 31, 2017

(65) Prior Publication Data

US 2018/0348726 A1    Dec. 6, 2018

(51) Int. Cl.
*G05B 19/042*    (2006.01)

(52) U.S. Cl.
CPC ............... *G05B 19/0428* (2013.01); *G05B 2219/25375* (2013.01)

(58) Field of Classification Search
CPC ............ G05B 19/0428; G05B 2219/25375
See application file for complete search history.

(56) References Cited

U.S. PATENT DOCUMENTS

| | | | | |
|---|---|---|---|---|
| 3,671,945 A | * | 6/1972 | Maggio, Jr. ................... | 714/748 |
| 4,652,998 A | * | 3/1987 | Koza ...................... | G06Q 50/34 |
| | | | | 273/274 |
| 5,115,396 A | * | 5/1992 | Keegan .............. | G05B 19/4062 |
| | | | | 123/361 |
| 5,394,069 A | * | 2/1995 | Danielson ................. | H02P 3/26 |
| | | | | 318/371 |
| 5,731,672 A | * | 3/1998 | Miyaguchi ............. | G11B 15/46 |
| | | | | 318/293 |
| 2001/0026197 A1 | * | 10/2001 | Tomisato ............... | H04B 3/145 |
| | | | | 333/18 |
| 2004/0233873 A1 | * | 11/2004 | Lee ........................ | G08C 17/02 |
| | | | | 370/335 |
| 2005/0049770 A1 | * | 3/2005 | Liu ...................... | B62D 5/0487 |
| | | | | 701/43 |
| 2005/0103312 A1 | * | 5/2005 | Uchiyama ............. | F02D 41/221 |
| | | | | 123/457 |
| 2006/0206252 A1 | * | 9/2006 | Katrak ...................... | F02D 9/02 |
| | | | | 701/70 |
| 2006/0294252 A1 | * | 12/2006 | Shoji ................... | H04L 43/0817 |
| | | | | 709/230 |
| 2009/0223285 A1 | * | 9/2009 | Windisch ............ | G01M 3/2815 |
| | | | | 73/40.5 R |

(Continued)

*Primary Examiner* — Thomas C Lee
*Assistant Examiner* — Charles Cai
(74) *Attorney, Agent, or Firm* — Invoke

(57) ABSTRACT

Techniques for error handling by a servomechanism are disclosed. The servomechanism determines, based on a first set of values assigned to servomechanism variables, electrical signals for controlling a component during a particular time interval, and applies the electrical signals to move the component. Subsequently, the servomechanism measures values for attributes associated with the component. Based on the measured attribute values, the servomechanism computes a second set of values for the servomechanism variables. Responsive to determining that the measured attribute values are erroneous, the servomechanism refrains from modifying the electrical signals based on the second set of values for the servomechanism variables.

20 Claims, 8 Drawing Sheets

(56) References Cited

U.S. PATENT DOCUMENTS

2010/0212568 A1* 8/2010 Zanfei .................... B63H 25/24
                                                            114/144 RE
2015/0365107 A1* 12/2015 Lee ................... H03M 13/2778
                                                            714/759
2016/0348603 A1* 12/2016 Mikawa ................ F02D 41/009

* cited by examiner

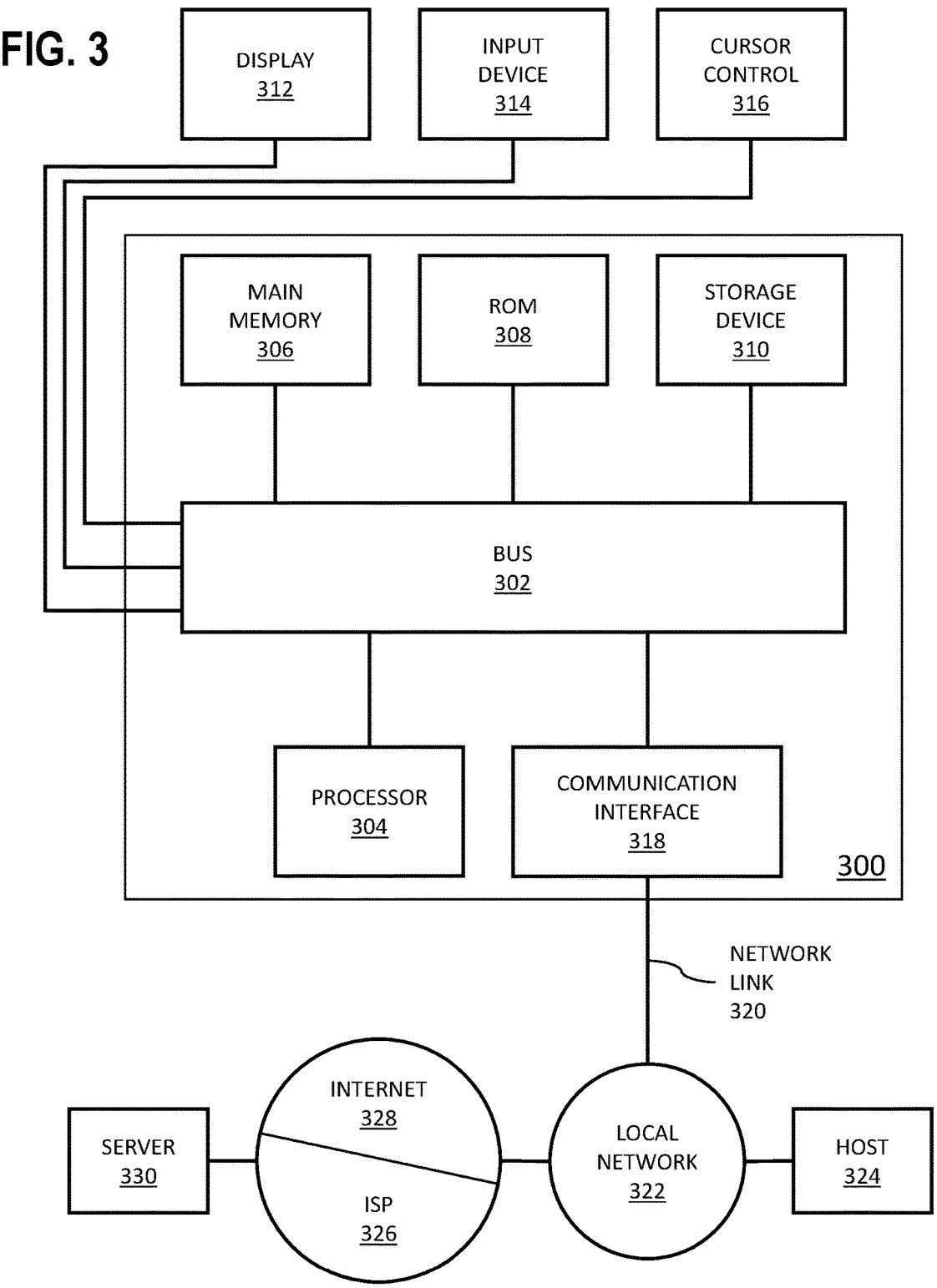

SERVOMECHANISM ERROR HANDLING

TECHNICAL FIELD

The present disclosure relates to servomechanisms. In particular, the present disclosure relates to error handling in servomechanisms.

BACKGROUND

A servomechanism (or "servo" for short) is a device or system that receives feedback and adjusts the operation of one or more physical components based on the feedback received. For example, based on feedback received by a servomechanism, the velocity, position, direction, or other operational property of a component may be adjusted. The adjustments are made automatically (i.e., through operation of the servomechanism itself), not manually by a human operator. For example, a human applying pressure to a brake pedal, to decrease the velocity of an automobile, is not a servomechanism. However, the brake pedal may be connected to an antilock braking system that uses a servomechanism to receive feedback (e.g., rotational velocity of the braking tires) and adjusts operation of the braking system accordingly (e.g., by releasing brake pressure to prevent the vehicle from skidding, if the tires stop rotating suddenly).

Many different types of feedback may be used in a servomechanism. For example, for position-based servomechanisms, the physical location of a component may be monitored and compared with an expected location. If there is a difference between the actual location and the expected location, a component may be slowed down or accelerated to compensate for the difference. Similarly, a mechanical governor, also known as a speed limiter, may be used to compare the actual speed of a component with an expected speed and adjust the actual speed accordingly. Servomechanisms also may be used in robotics to control the velocity, position, direction, or other operational property of a robotic component. Those skilled in the art will appreciate that many different types of servomechanisms exist that rely on many different types of feedback.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 shows a block diagram illustrating a computer system in accordance with one embodiment.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW AND EXAMPLES
3. ERROR HANDLING BY A SERVOMECHANISM
4. MISCELLANEOUS; EXTENSIONS
5. HARDWARE OVERVIEW
6. COMPUTER NETWORKS AND CLOUD NETWORKS

1. General Overview

One or more embodiments include a servomechanism configured for error handling. The servomechanism determines, based on a first set of values assigned to servomechanism variables, electrical signals for controlling a component during a particular time interval, and applies the electrical signals to move the component. Subsequently, the servomechanism measures values for attributes associated with the component. Based on the measured attribute values, the servomechanism computes a second set of values for the servomechanism variables. The second set of values, for the servomechanism variables, are to be used for determining a modification to the electrical signals being applied to move the component. Concurrently with or subsequent to computing the second set of values, the system determines that the measured attribute values, used for determining the modification to the electrical signals, are erroneous. Responsive to determining that the measured attribute values are erroneous, the servomechanism refrains from modifying the electrical signals based on the second set of values for the servomechanism variables. In an embodiment, refraining from using the second set of values includes reverting servomechanisms variables from the second set of values back to the first set of values.

One or more embodiments described in this Specification and/or recited in the claims may not be included in this General Overview section.

2. Architectural Overview and Examples

Figure 1A:
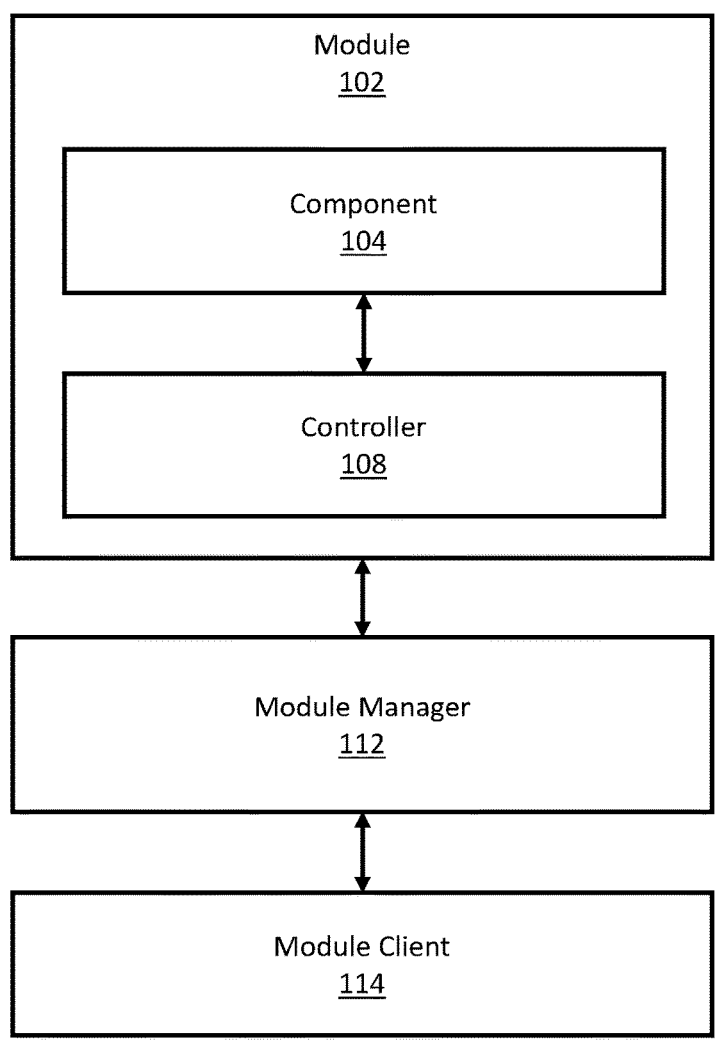
FIG. 1A is a block diagram illustrating a system in accordance with one embodiment.

FIG. 1A illustrates a system 100 in accordance with one or more embodiments. As illustrated in FIG. 1A, system 100 includes a module 102 that includes a component 104 and a corresponding controller 108. The system 100 also includes a module manager 112 and a module client 114. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 6, titled "Computer Networks and Cloud Networks."

In one embodiment, the module 102 is a physical unit that includes (i.e., physically within or via a physical connection) at least one component 104. The component 104 is a physical device, the operation of which is adjustable by a servomechanism (not shown). For example, the module 102 may be a vending machine, an industrial machine (e.g., operating in a production line, farm, or warehouse), a printer (e.g., an ink printer, laser printer, or 3-dimensional printer), a medical or scientific device (e.g., an automated pill sorter or substrate mixer), a vehicle (e.g., a railway car or self-driving automobile), an entertainment device (e.g., an amusement park ride or arcade machine), a household device (e.g., a vacuum cleaner or kitchen appliance), a digital storage device (e.g., a hard drive or storage library), a network switch, or any other kind of physical unit in which the operation of a component 104 is adjustable by a servomechanism. Those skilled in the art will appreciate that the foregoing list is not exhaustive and is provided merely by way of example.

While FIG. 1A illustrates only one component 104, the module 102 may include more than one component. For example, as discussed below, a storage library may include multiple robotic arms handling the storage devices managed by the storage library. Many different types of modules that include multiple components exist. Further, the module 104 may be combined with other modules (not shown), and/or the module 104 may be a combination of multiple sub-modules. For example, a storage library may include more than one inter-compatible storage library modules.

In one embodiment, the controller 108 is a digital device that helps control operation of the component 104. Specifically, the controller 108 may be configured to apply electrical signals to the component 104, to control the velocity, position, direction, and/or other operational properties of the component 104. If the module 102 includes multiple components, each component may be associated with a separate controller. Alternatively or in addition, multiple components may be associated with the same controller, and/or a single component may be associated with multiple controllers.

In one embodiment, the controller 108 is configured to perform servomechanism operations for the component 104. Specifically, the controller 108 may be configured to receive feedback associated with the component 104 and, based on the feedback, adjust operation of the component 104. The controller 108 may adjust operation of the component 104 by applying new electrical signals to the component 104 and/or modifying electrical signals that are already being applied to the component 104. In general, in one embodiment, the controller 108 refers to hardware and/or software configured to perform operations described herein for error handling in a servomechanism. Examples of operations for error handling in a servomechanism are described below.

In one embodiment, the controller 108 is directly coupled to the component 104 in a manner that causes the controller 108 to physically move with the component 104. For example, a controller for a robotic arm may be directly connected to the arm itself, so that when the arm moves, the controller is carried along with it. Alternatively, the controller 108 may be remotely coupled to the component 104 (e.g., through a network cable) so that the controller 108 does not move with the component 104.

In one embodiment, the module manager 112 is configured to manage operation of the module 102. Specifically, the module manager 112 may issue instructions to the controller 108, which in turn controls operation of the component 104 based on those instructions. For example, in storage library where the component 104 is a robotic arm, the module manager 112 may issue instructions to the controller 108 to remove a particular storage device. Based on those instructions, the controller 108 may apply electrical signals to the component 104 (i.e., the robotic arm in this example) so that the component 104 moves to the location of the storage device in the module 102 and removes the storage device. While the module manager 112 is shown in FIG. 1A as being separate from the module 102, the module manager 112 may itself be a component of the module 102. For example, if the module 102 is a storage library, the module manager 112 may be a server housed in the storage library enclosure.

In one embodiment, the module manager 112 receives instructions from a module client 114. Specifically, the module client 114 may be a computing device operating separately from the module 102 and module manager 112, for which the module 102 provides services. The module client 114 may be a web server or host, such as a server providing cloud-based services for multiple tenants (not shown). Accordingly, the module client 114 may have clients of its own, corresponding to the various tenants. In this example, the module 102 is part of the underlying infrastructure providing cloud-based services for the tenants. Cloud networks are discussed in further detail below. Alternatively or in addition, a module client 114 may be a tenant system or some other type of end user of the module 102. Further, the system 100 may include multiple module managers, and/or the system 100 may include multiple module clients communicatively coupled with each module manager.

In one embodiment, elements of the system 100, such as the controller 108, module manager 112, and/or module client 114, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 1B:
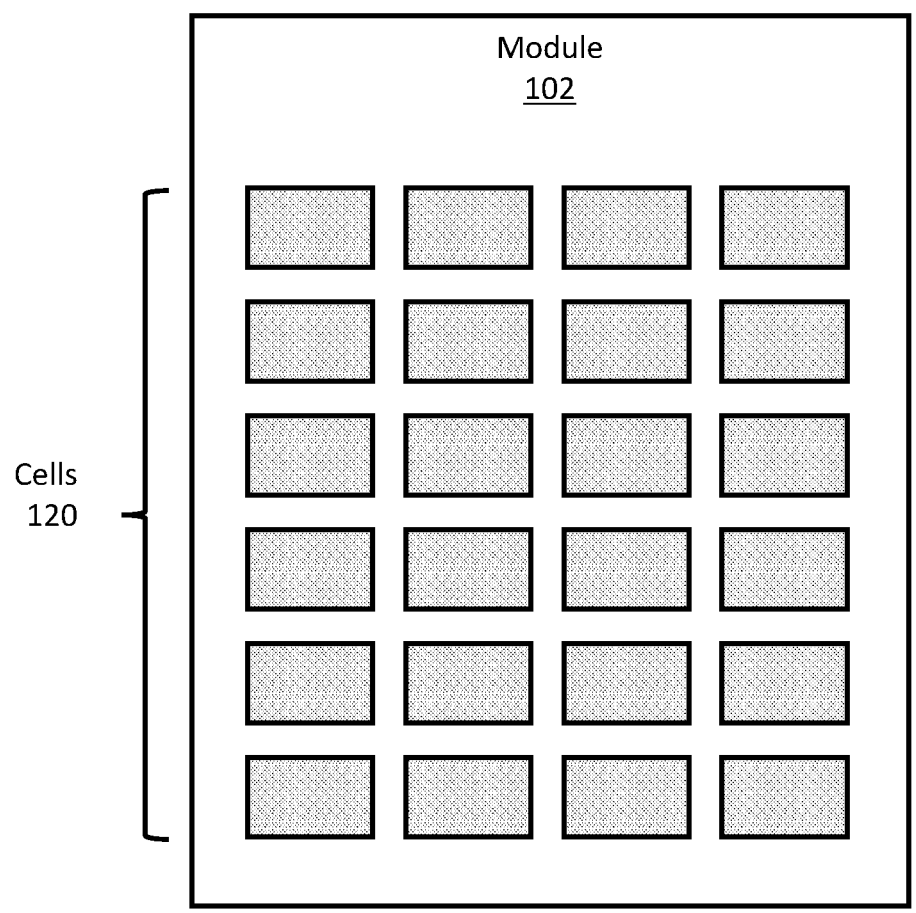
FIGS. 1B and 1C are block diagrams illustrating a module in accordance with one embodiment.

FIG. 1B is a block diagram illustrating a module 102 in accordance with one embodiment. Specifically, FIG. 1B illustrates an abstracted cross-section of a module 102 in accordance with one embodiment. The module 102 includes multiple cells 120 on which components (not shown in FIG. 1B) of the module 102 are configured to operate. In general, referring to FIG. 1B, the term "cells" may refer to a set of similar physical locations in the module 102. For example, if the module 102 is a vending machine, the cells 120 may be so-called "columns" corresponding to particular product selections. If the module 102 is a storage library, the cells 120 may be slots into which storage media (e.g., drives, disks, cartridges, etc.) are inserted. If the module 102 is a network switch, the cells 120 may be physical ports into which cables are inserted. The cells 120 may not be all of the same type. For example, in a storage library, some of the cells 120 may be general-purpose storage cells accepting different types of storage media, while others of the cells 120 may be specific types of storage cells accepting only a particular type of storage media, such as tape cartridges. Many different types of modules exist having different kinds of cells.

In one embodiment, the module 102 includes components in addition to cells or other than cells. In general, the module 102 may include many different types of electronic components, such as a power supply, network connection, sensors, display, storage device, service port, and/or any other type of appropriate electronic component depending on the specific type of module 102.

Figure 1C:
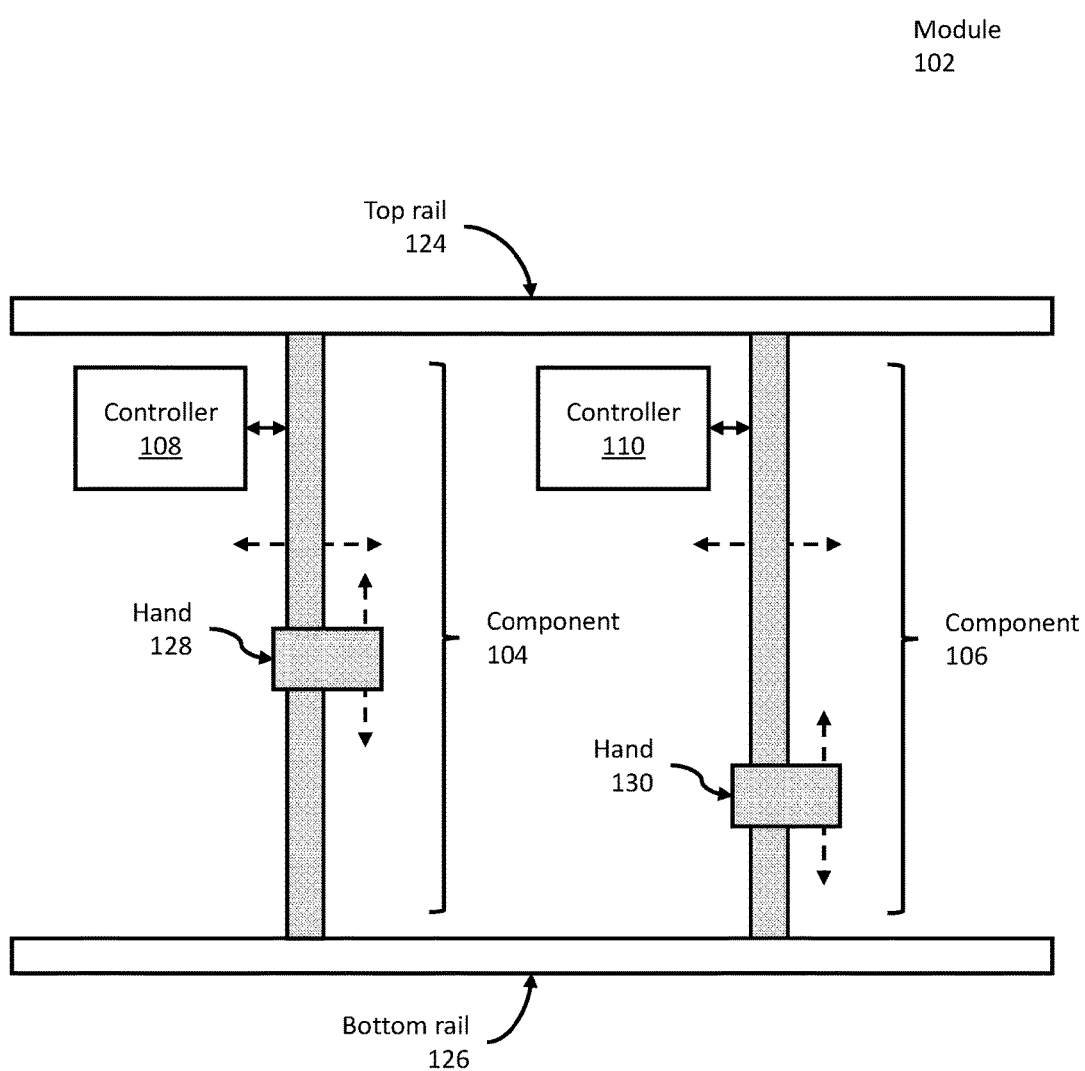

For example, FIG. 1C is a block diagram illustrating a module 102 in accordance with one embodiment. As illustrated in FIG. 1C, the module 102 includes two components 104, 106 operating along a top rail 124 and a bottom rail 126. As used here, the terms "top" and "bottom" are used to differentiate between the rails and may not accurately denote the vertical configuration of the top rail 124 and bottom rail 126 relative to each other. For example, the top rail 124 and bottom rail 126 may be on a same horizontal plane as each other, with FIG. 1C representing an overhead view of the module 102. Many different physical rail configurations may be used. Further, the module 102 may not include any rails, may include more than two rails, or may include only a single rail.

In one embodiment, component 104 has a hand 128 and component 106 has a hand 130. The hands 128, 130 are physical mechanisms used to manipulate other components and/or items in the module 102. For example, the hands 128, 130 may be used to manipulate items placed in cells in the module 102, such as the cells 120 illustrated in FIG. 1B. In one embodiment, the components 104, 106 are configured to follow one axis (e.g., horizontally) along the top rail 124 and bottom rail 126, while the hands 128, 130 are configured to follow another axis (e.g., vertically) along the components 104, 106. In this manner, the hands 128, 130 may be able to reach many different locations within the module 102. Further, if the module 102 has more than one rail, a component may have more than one motor (not shown), with each motor affecting movement of the component along the corresponding rail.

In one embodiment, each of the components 104, 106 has a corresponding controller 108, 110. Each controller is configured to apply electrical signals to its corresponding component, to control movement of the component within the module 102. As illustrated in FIG. 1C, each controller 108, 110 may be directly connected to its corresponding component 104, 106, so that when the component travels along the top rail 124 and bottom rail 126, the corresponding controller moves along with it. Alternatively, one or more of the controllers 108, 110 may be remotely connected to its corresponding component, so the controller does not move with the component.

Figure 1D:
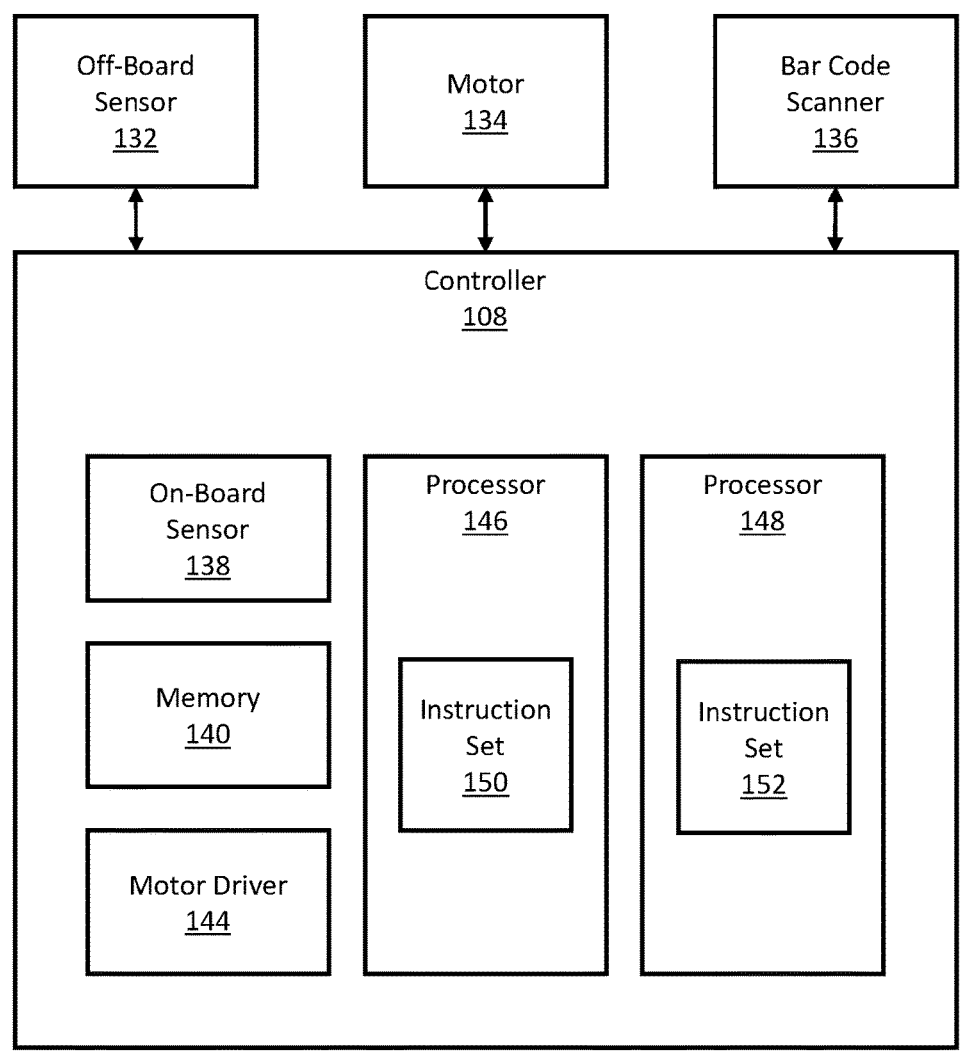
FIG. 1D is a block diagram illustrating a controller in accordance with one embodiment.

FIG. 1D is a block diagram illustrating a controller 108 in accordance with one or more embodiments. The controller 108 is configured to control the operation of a component (not shown) in a module (not shown). Further, the controller 108 is configured to perform operations for error handling in a servomechanism, as described in further detail below. The controller 108 may be a logic board, server, or any other type of computing structure or device suitable to perform controller operations described herein.

In one embodiment, the controller 108 includes one or more processors. As illustrated in FIG. 1D, the controller 108 includes two processors; processor 146 and processor 148. Each processor 146, 148 operates using a corresponding instruction set. Specifically, processor 146 uses instruction set 150, and processor 148 uses instruction set 152. The processors 146, 148 may be of the same type or may be of different types. For example, processor 146 may use a general purpose instruction set 150 and processor 148 may use a specialized instruction set 152. In one embodiment, the specialized instruction set 152 includes floating point operations that allow processor 148 to perform mathematical functions for a servomechanism more rapidly than processor 146 would be able to perform those same mathematical functions using the general purpose instruction set 150. For example, a general-purpose processor may be an Advanced RISC Machines (ARM) processor based on the Reduced Instruction Set Computer (RISC) design and the other processor may be a Digital Signal Processing (DSP) processor optimized for digital signal processing including floating point operations. Specifically, the DSP processor may be optimized for measuring, filtering, and/or compressing digital or analog signals, which may involve performing complex mathematical calculations. Performing those calculations quickly may help avoid performance concerns associated with latency and/or offload mathematical calculations from the general purpose processor. The DSP processor may also include fewer transistors and/or use less power than the general-purpose processor. In one embodiment, a general-purpose processor executes instructions relating to high-level commands and general system operations, while a specialized processor handles complex mathematical functions.

In one embodiment, the controller 108 also includes one or more non-transitory computer readable media, such as memory 140 and/or some other type of medium, for storing instructions and/or data used by the one or more processors 146, 148 to perform servomechanism operations. The one or more computer readable media may include executable instructions corresponding to one or more operating systems used by the processor(s), such as a LINUX operating system and/or a reduced kernel of an operating system.

In one embodiment, the controller 108 receives feedback about the operation of the component. The feedback may be used as input to servomechanism operations. For example, the controller 108 may receive feedback from one or more off-board sensors 132. As used here, the term "off-board" means that an off-board sensor 132 is communicatively coupled with the controller 108 but is not part of the controller 108 itself. For example, the off-board sensor 132 may be a sensor physically attached or communicating with the component, such as a thermometer, tachometer, tilt sensor, current sensor, or any other kind of sensor configured to receive feedback about the operation of the component and provide the feedback to the controller 108.

Alternatively or in addition, the controller 108 may include one or more on-board sensors 138. As used here, the term "on-board" means that the on-board sensor 138 is part of the controller 108 itself. For example, if the controller 108 is a logic board, the on-board sensor 138 may be attached to the same logic board. The on-board sensor 138 may be a thermometer, tachometer, tilt sensor, current sensor, or any other kind of sensor configured to receive feedback about the operation of the component.

In one embodiment, the controller 108 is configured to apply electrical signals to the component, to modify the component's operation. For example, the controller 108 may include a motor driver 144 configured to transmit electrical signals to a motor 134 that causes the component to move. The particular electrical signals transmitted from the motor driver 144 to the motor 134 may help determine how the component moves (i.e., direction, speed, etc.). Further, the component may include more than one motor 134, and a combination of electrical signals to the various motors may help determine how the component moves. A motor driver 144 may be configured to transmit electrical signals to a single motor 134, or to multiple motors. For a component with more than one motor (for example, a component operating along more than one rail), more than one motor driver may be used.

In one embodiment, the controller 108 is configured to control and receive feedback from various parts of the component, some of which may not be related to servomechanism operations. For example, the controller 108 may be configured to transmit electrical signals to, and receive electrical signals from, a bar code scanner 136. The bar code scanner 136 may be configured to read bar codes of items manipulated by the component within a module. For example, a hand 128 as illustrated in FIG. 1C may include a bar code reader. The bar code reader may be used to identify items stored in cells 120 as illustrated in FIG. 1B.

Figure 1E:
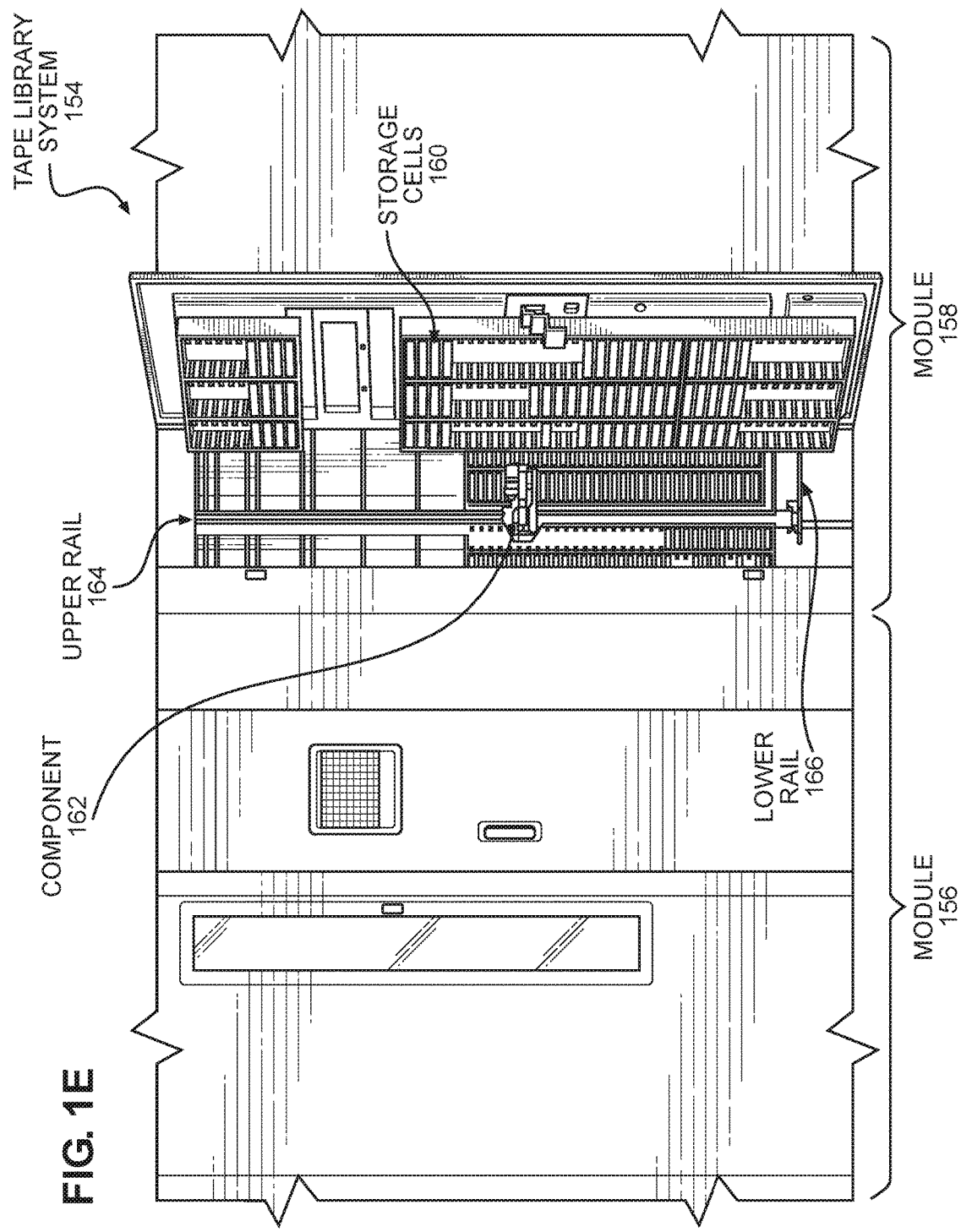
FIG. 1E is an illustration of a tape library system in accordance with one embodiment.

FIG. 1E is an illustration of a tape library system 154 in accordance with one embodiment. In this example, the tape library system 154 includes two modules: module 156 and module 158. The modules are connected along a vertical edge to form a single, modular unit. An upper rail 164 and lower rail 166 run the horizontal length of the tape library system 154, allowing a component 162 to access storage cells 160. Each of the storage cells 160 may be configured to accept tape drives and/or other storage media, as discussed above. In FIG. 1E, the storage cells 160 run the length of the tape library system 154 in both the front and back. The component 162 is a robot arm connected to the upper rail 164 and lower rail 166, allowing the component 162 to move along the rail under power of one or more motors. The component 162 also includes a robot hand, which moves vertically along the robot arm to access storage cells 160 at different heights in the tape library system 154. In one embodiment, the tape library system 154 includes more than one robot arm (not shown).

3. Error Handling by a Servomechanism

In one embodiment, a servomechanism is used to receive feedback and adjust the operation of a component, based on the feedback received. For example, the servomechanism may involve feedback received from a controller associated with a component, as described above. Further, the servomechanism may be implemented using instructions executed by one or more processors in a controller and/or module manager attached or otherwise communicatively coupled with the component.

In one embodiment, the servomechanism is subject to errors. For example, feedback received by the servomechanism may be erroneous. The feedback may be erroneous due to improper functioning of a sensor, data corruption in transit between a sensor and a controller, data corruption in digital storage (e.g., in memory storing feedback data, such as a register storing a specific number read by a sensor), a faulty read from digital storage, or any other mechanism or process by which the servomechanism may receive erroneous feedback. In one embodiment, reading the feedback from memory again provides an opportunity to receive correct feedback, even without the sensor taking a new reading.

Figure 2A:
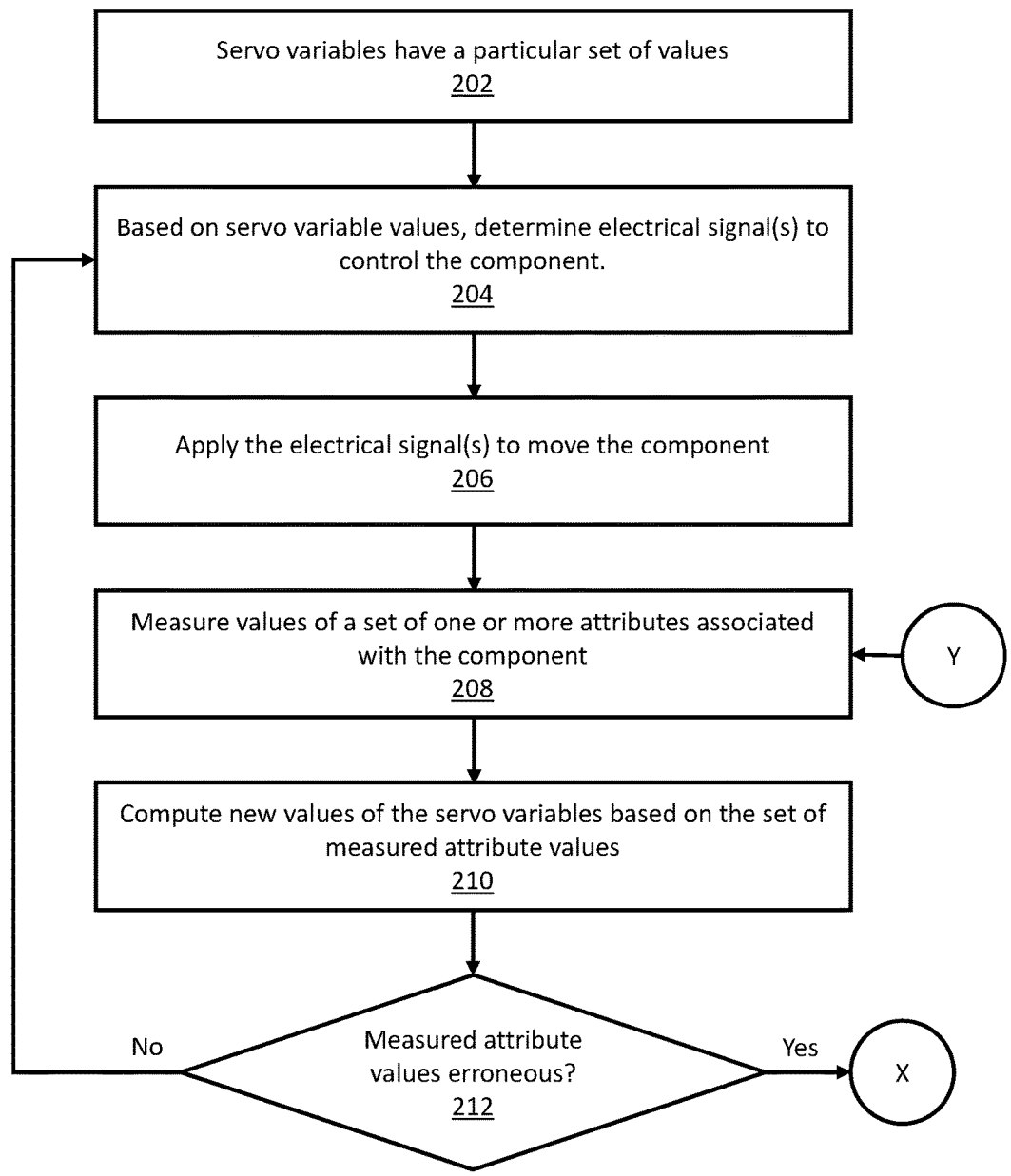
FIGS. 2A and 2B illustrate a set of operations for error handling in a servomechanism in accordance with one embodiment.
Figure 2B:
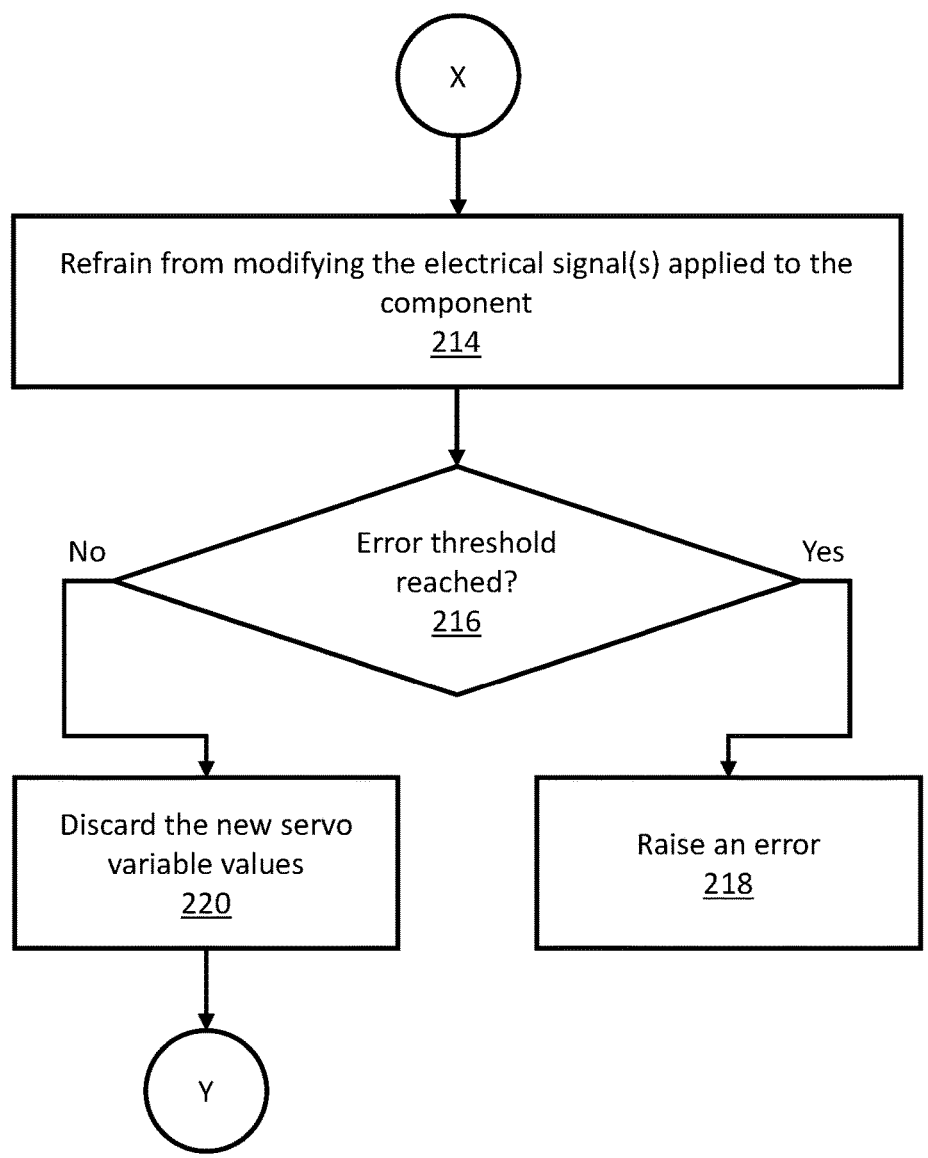

FIGS. 2A and 2B illustrate an example set of operations for error handling by a servomechanism in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

In one embodiment, the servomechanism operates using programmable variables. The variables may represent various aspects of the component's operational state and/or an internal execution state of the servomechanism. For example, the variables may represent one or more of the following: the physical positions of one or more components; current applied to one or more motors; system temperature(s); an operation that has been requested for one or more components to perform; and/or any other type of variable indicative of a component's operational state and/or internal execution state of the servomechanism. At a given point in time, the servomechanism variables have a particular set of values (Operation 202).

In one embodiment, the servomechanism operates as a state-space controller, in which a mathematical model represents a physical system (e.g., components in a module) as a set of variables corresponding to input, output, and state data. The "space" in the state-space controller may include two or more axes, with a particular state represented as a vector within that space. In this model, state information may be stored in one or more matrices. For example, one matrix may be used for filtering (e.g., position sampling and/or anti-aliasing); another matrix may be used for estimations (e.g., of velocity and/or acceleration); and another matrix may be used to manage physical controls (e.g., motion and/or stoplock mechanisms). Accordingly, a programmable variable used by the servomechanism may reference a data structure representing a matrix. Mathematical operations referred to herein may correspond to matrix multiplication and/or other forms of linear algebra. Alternatively or in addition, the servomechanism may use one or more proportional-integral-derivative (PID) control loops, with programmable variables referencing data used in PID controller operations.

In one embodiment, based on the values of the servomechanism variables, the servomechanism determines one or more electrical signals to use to control the component (Operation 204). The determination may be for a particular time interval, such as a particular number of nanoseconds, milliseconds, processor cycles, an interrupt interval, or any other type of time interval for which the electrical signal(s) may be determined.

In one embodiment, the servomechanism applies the electrical signal(s) (i.e., the electrical signals determined in Operation 204) to move the component (Operation 206). Applying the electrical signals involves sending instructions to one or more physical devices or mechanisms associated with the servomechanism, which in turn translate the electrical signal(s) to physical movement of the component. For example, referring to the controller 108 illustrated in FIG. 1D, a processor 146 executing servomechanism instructions may be used to determine an electrical signal to be applied to a motor 134 of a component. To move the component, the controller 108 may transmit instructions, corresponding to the electrical signal(s), to a motor driver 144. The motor driver 144 may translate the instructions to the corresponding electrical signal(s) and transmit the electrical signal(s) to the motor 134. The motor 134 may then translate the electrical signal(s) to corresponding physical movement of the component.

In one embodiment, the servomechanism measures values of a set of one or more attributes associated with the component (Operation 208). Specifically, the servomechanism may measure the value(s) by receiving information from one or more sensors associate with the component, such as an on-board sensor 138 and/or off-board sensor 132 as illustrated in FIG. 1D. Many different kinds of attributes may be measured. For example, attributes may include: a tachometer count; a temperature; an absolute position; a relative position; a tilt angle; a velocity; a rotational speed; and/or any other type of measurable attribute of a component in a module. Those skilled in the art will appreciate that many different types of attributes may be measured, depending on the particular module and component(s) being used.

In one embodiment, the servomechanism computes new values of the servomechanism variables (i.e., the variables having a particular set of values in Operation 202), based on the set of one or more measured attribute values (Operation 210). Calculating the new values may involve any number of calculations, depending on the particular module and component(s) being used. For example, the calculations may include one or more of the following: calculating a feed-forward current to address friction; comparing values associated with different rails (for example, in a module where a component is coupled with more than one rail, the component may have a motor for managing its position along each rail); backlash compensation; velocity calculations; and/or any other type of calculation of values for a servomechanism.

In one embodiment, the servomechanism determines whether the set of one or more attribute values is erroneous (Operation 212). An attribute value may be determined to be erroneous if one or more particular values is outside of an acceptable range of values. For a state-space controller, for example, the particular value(s) may be based on one or more matrix calculations. Alternatively or in addition, an attribute value may be compared directly with an acceptable range of values. Further, an attribute value may be erroneous due to an actual system error, or due to data corruption as discussed elsewhere herein. An erroneous measured attribute value may indicate many different types of actual or potential error conditions. For example, in a storage system, error conditions may include: a stalled component; a component travelling outside its stop-lock range; a software fault; an invalid request (e.g. to move a component to a disallowed position); overcurrent (e.g., on a rail motor or hand); an excessive position error; a tachometer phase error; excessive application of a maximum or minimum allowable current; a failure of a component to stop; unrecognized hardware detected; a component failing to move; excessive heat; gear slip; an unknown error; or any other type of error condition, or combination thereof. Further, a single attribute value may be determined to be erroneous, or multiple attribute values may be determined to be erroneous.

In one embodiment, if the set of measured attribute values is not erroneous (i.e., as determined in Operation 212), then the servomechanism uses the new values of the servomechanism variables (i.e., the values computed in Operation 210) to determine one or more electrical signal(s) to control the component (Operation 204). Specifically, the electrical signal(s) thus determined may be for a subsequent time interval. The electrical signal(s) may be the same as those already being applied to the component, or may be different. In this manner, the servomechanism may effectively operate as an iterative loop, measuring attributes and, if needed, adjusting operation of the component through the application of electrical signals over a series of time intervals.

In one embodiment, if the set of measured attribute values is erroneous (i.e., as determined in Operation 212), then the servomechanism refrains from modifying the electrical signal(s) applied to the component (Operation 214). Specifically, even though new values of the servomechanism variables were calculated, based on the measured attribute values, in Operation 210, the new values of the servomechanism values may not be used. Refraining from modifying the electrical signal(s) in this manner helps ensure that operation of the component is not adjusted based on erroneous attribute values. Depending on the type of component, avoiding such adjustment may help avoid overheating a component, moving a component to a disallowed position, colliding the component with another component or part of the module, or any other type of problem that may arise from adjusting operation of a component based on erroneous data.

In one embodiment, the servomechanism determines whether an error threshold has been reached (Operation 216). Specifically, the error threshold may refer to a specific number of times that measured attribute values have been determined to be erroneous in Operation 212. The error threshold may refer to a number of sequential instances of erroneous measured attribute values, a number of erroneous measured attribute values over a certain period of time, a total number of erroneous measured attribute values during an operational session (e.g., the time between power-up and power-down), or any other type of standard for determining that an error threshold has been satisfied. In one embodiment, an error threshold is reached if the measured attribute values are erroneous twice in a row.

In one embodiment, if an error threshold is reached (i.e., Operation 216), then the servomechanism raises an error (Operation 218). Raising an error may involve applying electrical signals to one or more components to return them to a particular state, such as a reboot or reset. Returning a component to a particular state may involve shutting down the component, physically stopping the component, and/or moving the component to a particular physical location. Alternatively or in addition, raising an error may involve transmitting an error message for processing elsewhere, such as a module manager 112 and/or module client 114 as illustrated in FIG. 1A. In one embodiment, an error message is displayed on a console viewable by a human user of the module, who may then take appropriate corrective and/or repair actions to address the error.

In one embodiment, if an error threshold is not reached (i.e., Operation 216), then the servomechanism discards the new servomechanism variable values (Operation 220). Discarding the new servomechanism variable values may involve reassigning values of one or more of the servomechanism variables. For example, a servomechanism may maintain two sets of variables: one set that represents the state of the servomechanism in a current time interval, and one set that represents the state of the servomechanism in a subsequent time interval. The values that are discarded may be those of the variables representing the state of the servomechanism in a subsequent time interval.

The following is an example using pseudocode for illustrative purposes. Those skilled in the art will appreciate that this pseudocode is highly abstracted and simplified, and should not be construed as limiting the scope of one or more embodiments. In this example, variables that represent the state of the servomechanism in a current time interval are referred to, collectively, as "currentState," and the variables that represent the state of the servomechanism in a subsequent time interval are referred to, collectively, as "nextState." Function calls are used to determine operational steps that may be far more complicated and involve many functions different from those shown in this simplified example. In this example, when the new values of the servomechanism values are computed (i.e., Operation 210), the values are assigned to nextState. If the measured attribute values are determined not to be erroneous, then the currentState variables are assigned the values of the next- State variables. However, if the measured attribute values are determined to be erroneous, then the nextState variables are reassigned the values of the currentState variables. By reassigning the values of currentState to nextState, the new values previously assigned to nextState are effectively discarded.

```
1   nextState = computeServoVariableValues(measuredAttributeValues);
2   if (attributeValuesAreErronous(nextState)) {
3       nextState = currentState;
4   } else {
5       currentState = nextState;
6   }
```

In one embodiment, a third set of variables may be used that represents a backup of the currentState variables. If measured attribute values are determined to be erroneous, the values of the backup variables may be assigned to both "currentState" and "nextState." Again, the terms "currentState" and "nextState," as used here, are abstractions used for exemplary purposes only.

In one or more embodiments, the servomechanism measures the values of attribute(s) associated with the component again (Operation 208). Measuring the values of the attributes again may or may not involve taking new readings from the associated sensor(s). For example, measuring the values again may simply involve reading the values from memory again, such as from a register in which a sensor stores a value. Alternatively or in addition, measuring the value of an attribute again may involve taking a new reading from a sensor.

In one embodiment, measuring the values of the attributes again when they are determined to be erroneous is an effective way to handle errors by a servomechanism. In particular, doing so may be effective when a sensor is not defective but data read by a sensor was corrupted in some fashion. For example, the data may be corrupted in transit between a sensor and a controller (e.g., due to electrical noise in the surrounding environment), in digital storage (e.g., in memory storing feedback data, such as a register storing a specific number read by a sensor), a faulty read from digital storage, or any other mechanism or process by which the servomechanism may receive erroneous feedback.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A servomechanism controlling a component, the servomechanism comprising:
   at least one processor;
   the servomechanism configured to use the at least one processor to execute operations comprising:
      determining, based on a first plurality of values respectively assigned to a plurality of servomechanism variables, a first set of one or more electrical signals for controlling the component during a first time interval;
      applying the first set of one or more electrical signals, during the first time interval, to move the component from a first physical position to a second physical position;
      subsequent to the first time interval: obtaining an invalid set of one or more measured attribute values, based on one or more valid sensor measurements stored at one or more memory locations by one or more sensors configured to measure one or more attributes associated with the component;
      computing a second plurality of values for the plurality of servomechanism variables based at least in part on the invalid set of one or more measured attribute values;
      determining that the invalid set of one or more measured attribute values is erroneous;
      responsive to determining that the invalid set of one or more measured attribute values is erroneous:
         refraining from modifying the first set of one or more electrical signals based on the second plurality of values computed for the plurality of servomechanism values;
         discarding the second plurality of values for the plurality of servomechanism variables;
         obtaining a valid set of one or more measured attribute values, based on the one or more valid sensor measurements stored at the one or more memory locations, without the one or more sensors storing new sensor measurements at the one or more memory locations;
         computing a third plurality of values for the plurality of servomechanism variables based at least in part on the valid set of one or more measured attribute values;
         controlling operation of the component based at least in part on the third plurality of values for the plurality of servomechanism variables.

2. The servomechanism of claim 1, wherein the operations further comprise:
   subsequent to computing the second plurality of values for the plurality of servomechanism variables, assigning the second plurality of values to the plurality of servomechanism variables; and
   responsive to determining that the invalid set of measured attribute values is erroneous, reassigning the first plurality of values to the plurality of servomechanism variables.

3. The servomechanism of claim 1, wherein the operations further comprise:
   subsequent to controlling operation of the component based at least in part on the third plurality of values for the plurality of servomechanism variables,
   (a) re-measuring values for the one or more attributes associated with the component to obtain an updated set of one or more measured attribute values,
   (b) computing a fourth plurality of values for the plurality of servomechanism variables based on the updated set of one or more measured attribute values,
   (c) determining, based on the fourth plurality of values for the servomechanism variables, a second set of one or more electrical signals for controlling the component during a second time interval, and
   (d) applying the second set of one or more electrical signals, during the second time interval, to move the component to a third physical position.

4. The servomechanism of claim 1, wherein the operations further comprise:
   subsequent to controlling operation of the component based at least in part on the third plurality of values for the plurality of servomechanism variables,
   (a) re-measuring values for the one or more attributes associated with the component to obtain an updated set of one or more measured attribute values,
   (b) computing a fourth plurality of values for the plurality of servomechanism variables based on the updated set of one or more measured attribute values,
   (c) determining that the updated set of one or more measured attribute values is erroneous, and
   (d) responsive to determining that the updated set of one or more measured attribute values is erroneous, refraining from modifying operation of the component based on the fourth plurality of values computed for the plurality of servomechanism values.

5. The servomechanism of claim 1, wherein the operations further comprise:
   raising an error when a number of times that measured attribute values are erroneous reaches a predetermined threshold.

6. The servomechanism of claim 5, wherein raising the error comprises shutting down the component.

7. The servomechanism of claim 1, wherein the plurality of servomechanism variables comprises state data stored in at least one matrix.

8. The servomechanism of claim 1, wherein determining that the invalid set of one or more measured attribute values is erroneous comprises determining that a measured attribute value from the invalid set of one or more measured attribute values is outside of a predetermined tolerance range.

9. The servomechanism of claim 1, wherein determining that the invalid set of one or more measured attribute values is erroneous is based on at least one value from the second plurality of values computed for the plurality of servomechanism variables based on the invalid set of one or more measured attribute values.

10. The servomechanism of claim 1, wherein the component is a robotic arm operating along a rail in a tape library system.

11. One or more non-transitory machine-readable media comprising instructions which, when executed by one or more processors, cause a servomechanism to perform operations comprising:
- determining, based on a first plurality of values respectively assigned to a plurality of servomechanism variables, a first set of one or more electrical signals for controlling a component during a first time interval;
- applying the first set of one or more electrical signals, during the first time interval, to move the component from a first physical position to a second physical position;
- subsequent to the first time interval: obtaining an invalid set of one or more measured attribute values, based on one or more valid sensor measurements stored at one or more memory locations by one or more sensors configured to measure one or more attributes associated with the component;
- computing a second plurality of values for the plurality of servomechanism variables based at least in part on the invalid set of one or more measured attribute values;
- determining that the invalid set of one or more measured attribute values is erroneous;
- responsive to determining that the invalid set of one or more measured attribute values is erroneous:
  - refraining from modifying the first set of one or more electrical signals based on the second plurality of values computed for the plurality of servomechanism values;
  - discarding the second plurality of values for the plurality of servomechanism variables;
  - obtaining a valid set of one or more measured attribute values, based on the one or more valid sensor measurements stored at the one or more memory locations, without the one or more sensors storing new sensor measurements at the one or more memory locations;
  - computing a third plurality of values for the plurality of servomechanism variables based at least in part on the valid set of one or more measured attribute values;
  - controlling operation of the component based at least in part on the third plurality of values for the plurality of servomechanism variables.

12. The one or more media of claim 11, further comprising instructions which, when executed by one or more processors, cause the servomechanism to perform operations comprising:
- subsequent to computing the second plurality of values for the plurality of servomechanism variables, assigning the second plurality of values to the plurality of servomechanism variables; and
- responsive to determining that the invalid set of measured attribute values is erroneous, reassigning the first plurality of values to the plurality of servomechanism variables.

13. The one or more media of claim 11, further comprising instructions which, when executed by one or more processors, cause the servomechanism to perform operations comprising:
- subsequent to controlling operation of the component based at least in part on the third plurality of values for the plurality of servomechanism variables,
  - (a) re-measuring values for the one or more attributes associated with the component to obtain an updated set of one or more measured attribute values,
  - (b) computing a fourth plurality of values for the plurality of servomechanism variables based on the updated set of one or more measured attribute values,
  - (c) determining, based on the fourth plurality of values for the servomechanism variables, a second set of one or more electrical signals for controlling the component during a second time interval, and
  - (d) applying the second set of one or more electrical signals, during the second time interval, to move the component to a third physical position.

14. The one or more media of claim 11, further comprising instructions which, when executed by one or more processors, cause the servomechanism to perform operations comprising:
- subsequent to controlling operation of the component based at least in part on the third plurality of values for the plurality of servomechanism variables,
  - (a) re-measuring values for the one or more attributes associated with the component to obtain an updated set of one or more measured attribute values,
  - (b) computing a fourth plurality of values for the plurality of servomechanism variables based on the updated set of one or more measured attribute values,
  - (c) determining that the updated set of one or more measured attribute values is erroneous, and
  - (d) responsive to determining that the updated set of one or more measured attribute values is erroneous, refraining from modifying operation of the component based on the fourth plurality of values computed for the plurality of servomechanism values.

15. The one or more media of claim 11, further comprising instructions which, when executed by one or more processors, cause the servomechanism to perform operations comprising:
- raising an error when a number of times that measured attribute values are erroneous reaches a predetermined threshold.

16. The one or more media of claim 15, wherein raising the error comprises shutting down the component.

17. The one or more media of claim 11, wherein the plurality of servomechanism variables comprises state data stored in at least one matrix.

18. The one or more media of claim 11, wherein determining that the invalid set of one or more measured attribute values is erroneous comprises determining that a measured attribute value from the invalid set of one or more measured attribute values is outside of a predetermined tolerance range.

19. The one or more media of claim 11, wherein determining that the invalid set of one or more measured attribute values is erroneous is based on at least one value from the second plurality of values computed for the plurality of servomechanism variables based on the invalid set of one or more measured attribute values.

20. The one or more media of claim 11, wherein the component is a robotic arm operating along a rail in a tape library system.

* * * * *